US010884649B2

(12) United States Patent
Miyamura et al.

(10) Patent No.: US 10,884,649 B2
(45) Date of Patent: Jan. 5, 2021

(54) TAPE DRIVE DATA RECLAMATION

(71) Applicant: INTERNATIONAL BUSINESS MACHINES CORPORATION, Armonk, NY (US)

(72) Inventors: Tsuyoshi Miyamura, Yokohama (JP); Sosuke Matsui, Higashimurayama (JP); Tohru Hasegawa, Tokyo (JP); Hiroshi Itakagi, Yokohama (JP); Noriko Yamamoto, Tokyo (JP); Shinsuke Mitsuma, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/575,520

(22) Filed: Sep. 19, 2019

(65) Prior Publication Data
US 2020/0042229 A1    Feb. 6, 2020

Related U.S. Application Data

(63) Continuation of application No. 16/013,123, filed on Jun. 20, 2018, now Pat. No. 10,452,305.

(51) Int. Cl.
*G06F 13/00* (2006.01)
*G06F 3/06* (2006.01)
*G11B 20/12* (2006.01)

(52) U.S. Cl.
CPC .......... *G06F 3/0649* (2013.01); *G06F 3/0607* (2013.01); *G06F 3/0631* (2013.01);
(Continued)

(58) Field of Classification Search
CPC .................................................. G06F 3/0686
See application file for complete search history.

(56) References Cited

U.S. PATENT DOCUMENTS 6,718,427 B1    4/2004    Carlson
6,816,941 B1    11/2004   Carlson
(Continued)

OTHER PUBLICATIONS

Disclosed Anonymously, "Method for Tape to Cloud Reclamation and Defragmentation", IP.com Prior Art Database Technical Disclosure, IP.com No. IPCOM000239024D, Publication Date: Oct. 1, 2014, pp. 1-2.
(Continued)

*Primary Examiner* — Sean D Rossiter
(74) *Attorney, Agent, or Firm* — L. Jeffrey Kelly

(57) ABSTRACT

Method, computer program product, and system embodiments of the present disclosure may include a computing device which may set a predetermined flag on data to be copied from a primary storage tier and a secondary storage tier. The computing device may identify a first portion of the flagged data as being in a pre-migrated state stored on the primary storage tier and migrate the flagged pre-migrated data from the primary storage tier to a target medium. The computing device may identify a second portion of the flagged data as being in a migrated state stored on the secondary storage tier. The computing device may recall the flagged migrated data from the secondary storage tier to the primary storage tier and migrate the recalled migrated data from the primary storage tier to the target medium.

20 Claims, 8 Drawing Sheets

(52) U.S. Cl.
CPC .......... *G06F 3/0652* (2013.01); *G06F 3/0686* (2013.01); *G11B 20/1201* (2013.01)

(56) References Cited

U.S. PATENT DOCUMENTS

| | | | |
|---|---|---|---|
| 7,275,075 B2 | 9/2007 | Cannon | |
| 7,710,681 B2 | 5/2010 | Itagaki | |
| 8,341,346 B2 | 12/2012 | Ashton | |
| 8,554,808 B2 | 10/2013 | Fukatani | |
| 8,738,588 B2 | 5/2014 | Cannon | |
| 8,930,617 B2 | 1/2015 | Haustein | |
| 8,935,469 B2 | 1/2015 | Haustein | |
| 9,025,261 B1 | 5/2015 | Hasegawa | |
| 9,087,549 B2 | 7/2015 | Katagiri | |
| 9,213,496 B2 | 12/2015 | Gibble | |
| 9,423,962 B1 * | 8/2016 | Basham | G06F 3/0604 |
| 9,557,928 B2 | 1/2017 | Haustein | |
| 9,600,493 B1 | 3/2017 | Hasegawa | |
| 2010/0049834 A1 | 2/2010 | Maruyama | |
| 2012/0179868 A1 | 7/2012 | Haustein | |
| 2015/0022917 A1 | 1/2015 | Ashida | |
| 2015/0055241 A1 | 2/2015 | Abe | |
| 2015/0309748 A1 | 10/2015 | Haustein | |
| 2016/0063007 A1 | 3/2016 | Iwasaki | |
| 2016/0077750 A1 | 3/2016 | Erdmann | |
| 2017/0031603 A1 | 2/2017 | Hasegawa | |
| 2017/0083437 A1 | 3/2017 | Hasegawa | |
| 2017/0153820 A1 | 6/2017 | Hasegawa | |
| 2018/0157413 A1 | 6/2018 | Kawamura | |
| 2018/0314632 A1 | 11/2018 | Krishnamurthy | |

OTHER PUBLICATIONS

Mell et al., "The NIST Definition of Cloud Computing", Recommendations of the National Institute of Standards and Technology, Special Publication 800-145, Sep. 2011, 7 pages.

Pending U.S. Appl. No. 16/013,108, filed Jun. 20, 2018, entitled "Tape Drive Data Reclamation", pp. 1-47.

* cited by examiner

TAPE DRIVE DATA RECLAMATION

BACKGROUND

The present invention relates generally to a method, system, and computer program for tape drive data reclamation. More particularly, the present invention relates to a method, system, and computer program for tape drive data reclamation using only a single tape drive.

Hierarchical storage management (HSM) is a known technology that realizes efficient use of a limited storage capacity. HSM is a scheme for arranging data that is frequently referred to in a high-speed and high-cost primary storage unit, such as RAID and SSD, and arranging data that is referred to less frequently in a low-speed and low-cost secondary storage unit. HSM may be implemented, for example, in IBM® products such as the IBM System Storage Virtualization Engine TS7700 and IBM Spectrum Archive™ Enterprise Edition.

A state where a certain piece of data is only stored in a primary storage unit is called a "resident" state, a state where a certain piece of data is stored not only in the primary storage unit but also in a secondary storage unit is called a "pre-migrated" state, and a state where a certain piece of data is only stored in the secondary storage unit is called a "migrated" state. For example, all pieces of TS7700 data are first stored in the primary storage unit and thus placed in the resident state. After several minutes, the pieces of data are copied to the secondary storage unit and thus placed in the pre-migrated state. The pieces of data will then be fully moved to the secondary storage unit when the system has only a very little disk space remaining; thus placing the pieces of data in the migrated state.

Storage products such as the IBM System Storage Virtualization Engine TS7700 and IBM Spectrum Archive™ Enterprise Edition employ a magnetic tape as the secondary storage unit. When a certain piece of data is written to a magnetic tape, which is a sequential-access medium, and the same piece of data is subsequently updated, the piece of data that has been updated is appended to the end of the tape while the previous data is handled as an invalid area. When updates to the data frequently occur, the proportion of the invalid area increases, causing relative decrease in the capacity of the tape.

As a scheme for solving this problem, a technique called reclamation is known. Reclamation is a technique of only reading valid data from a tape that includes an invalid area and writing the valid data that has been read to another tape. Reclamation requires two tape drives, for the source tape from which the target data should be read and the destination tape to which the data that has been read should be written should be simultaneously accessed. In recent years, due to the increase in magnetic tape capacity, reclamation processing takes longer and the two tape drives are occupied longer, which is now recognized as a drawback of the technique. For example, the data transfer rate to a tape compatible with an IBM® TS1150 tape drive is up to 360 megabytes per second. When data is to be read from a tape cartridge of 10 terabytes using two TS1150 tape drives to carry out reclamation, then the two drives may be occupied for about eight hours (=10 (TB)/360 (MB/sec)).

Further, in the case where data is moved between tape drives, it is possible to directly transfer the data without going through the primary storage of a host server, by using a mechanism called Extended Copy of the tape drives. In the case, where the two tape drives and the tapes are in good condition, and the data can be transferred at the same transfer speed, it is possible to transfer the data most efficiently. However, because reclamation is aimed to resolving invalid regions of the transfer source tape, data is read out on a memory of the host server in units of file using a "cp" command, i.e. a "copy" command, or the like, and written in the transfer destination tape without going through the primary storage, i.e. without using Extended Copy. Therefore, because it is necessary to recreate metadata, such as file name, and file location on the tape, of the file for the transfer destination tape, it takes longer time than it would in Extended Copy. Also, reclamation is usually performed when the number of fragments (fragmented data) of transfer source data becomes large or a tape is worn out as a result of being frequently used, or in the case when data is moved to a newer generation tape. Therefore, readout speed and transfer speed from the transfer source tape are often inferior to write speed and transfer speed of the transfer destination tape. This results in the problem wherein the write destination tape drive tries to transfer data at lower speed than it is capable of to synchronize the transfer speed with the source tape drive, and the readout speed of the tape drive on the readout side becomes even slower due to a difference in transfer speed between the drives. Further, if reclamation is performed for the purpose of evacuating data from a worn tape, it takes time as a result of repeating the readout of data which is difficult to be read out, and in the worst case, data cannot be read out and lost in the process of reclaim.

Thus, a solution for solving the problems of prolonged and inefficient data reclamation associated with using multiple tape drives is needed.

BRIEF SUMMARY

An embodiment of the invention may include a method, computer program product and computer system for copying data from source media to target media in a storage system. The method, computer program product, and computer system may include a computing device which may set a predetermined flag on data to be copied from a primary storage tier and a secondary storage tier. The computing device may identify pre-migrated data being a first portion of the flagged data in a pre-migrated state stored on the primary storage tier and migrate the flagged pre-migrated data from the primary storage tier to a target medium. The computing device may identify migrated data as being a second portion of the flagged data in a migrated state stored on the secondary storage tier. The computing device may recall the flagged migrated data from the secondary storage tier to the primary storage tier, and migrate the recalled migrated data from the primary storage tier to the target medium.

DETAILED DESCRIPTION

Figure 1:
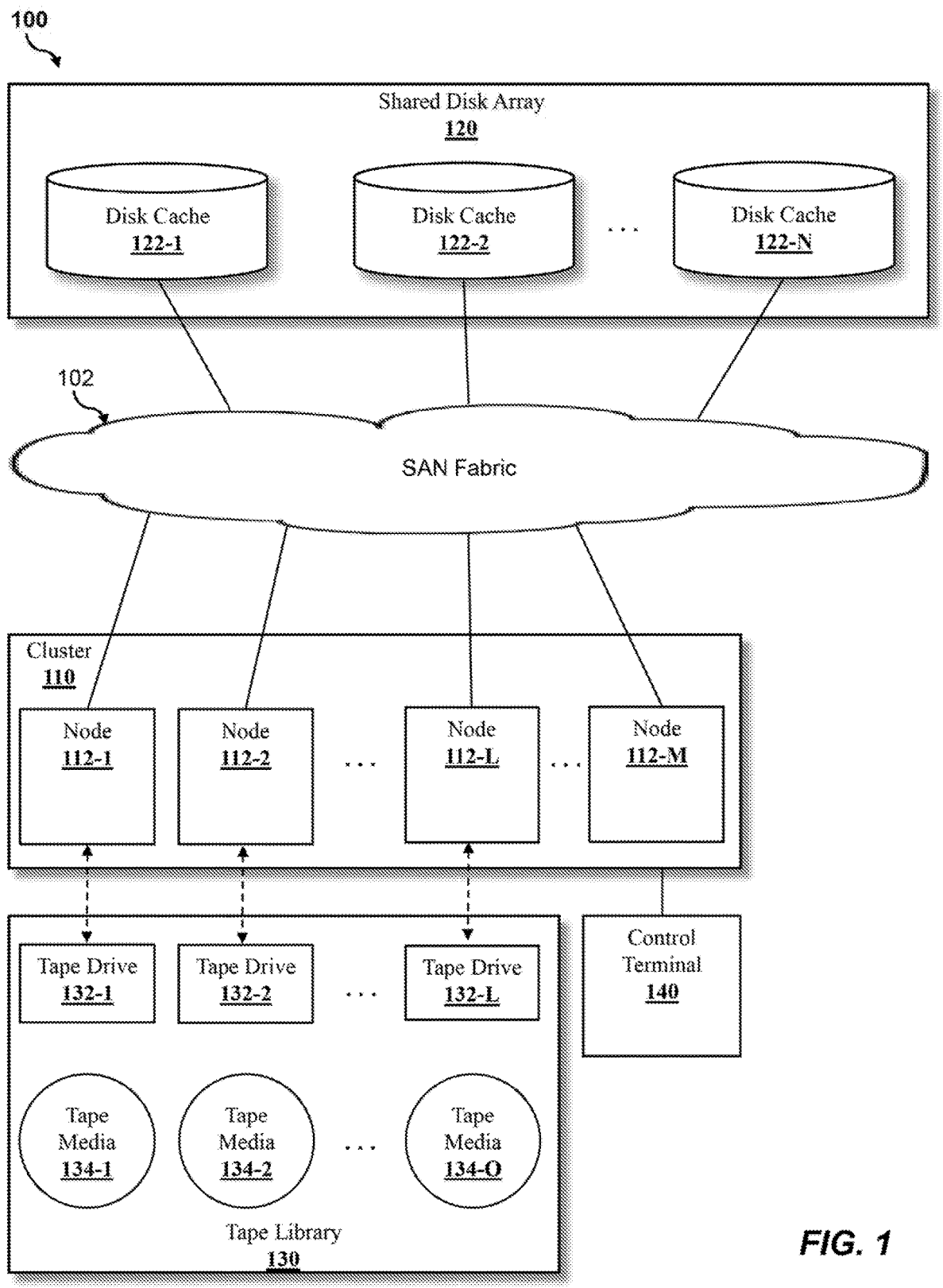
FIG. 1 illustrates an overview of a hierarchical storage system, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise. Now, the present invention will be described using particular embodiments, and the embodiments described hereafter are understood to be only referred as examples and are not intended to limit the scope of the present invention.

One or more embodiments according to the present invention are directed to methods, computer systems, storage systems and computer program products for reclaiming data from a source medium to a target medium in a storage system.

Current data reclamation systems have several problems and inefficiencies such as requiring two tape drives which prolongs data reclamation and further presents issues such as tape drive synchronization problems. Another problem presented by current data reclamation systems is that data reclamation is performed from tape to tape using a memory, which is highly likely to cause a tape to deteriorate due to a prolonged use period. For example, current data reclamation systems may use two tape drives with different data transfer speeds; thus, the two tape drives must be synced which is achieved by rewinding one of the tape drives which results in degradation of the transfer speed and further makes the length of data transfer unpredictable. Further, current reclamation systems using two drives may cause extremely long data transfer times due to readout errors on one tape drive, which may cause an error recovery to be repeatedly executed and ultimately having the data lost or unable to be read out. Further, current data reclamation systems require large amounts of storage space to be available on an expensive primary storage unit corresponding to the amount of data to be reclaimed from a tape. For example, once all the data on a tape are read out on the primary storage using one tape drive, the files stored on the primary storage are then written to another tape using the same tape drive. However, this process requires that the available capacity on the primary storage unit on the host server correspond to the capacity of the data on the one or more tapes from which the data is to be reclaimed. For example, 10 TB of data can be written to a TS1150 tape. However, when data is written to a tape it is usually compressed at a rate of approximately 1:2.5, depending on a type of the data. Thus, it is necessary to secure 25 TB of available storage capacity on the primary storage in advance of reclamation.

The present invention provides a mechanism of minimizing the number of occupied tape drives for data reclamation by using only one tape. Further, the present invention provides a mechanism for minimizing the capacity of the primary storage unit to be secured on a host by using a migration policy having limited intervals of execution periods. The present invention also provides a mechanism for avoiding the problem of transfer speed degradation during data transfer between tape drives by passing through the primary storage. The present invention also provides a mechanism which solves the problem of data loss during reclamation due to degradation of performance or a failure of readout from a deteriorated tape by using only a single tape drive, thus, avoiding these synchronization errors.

Figure 2:
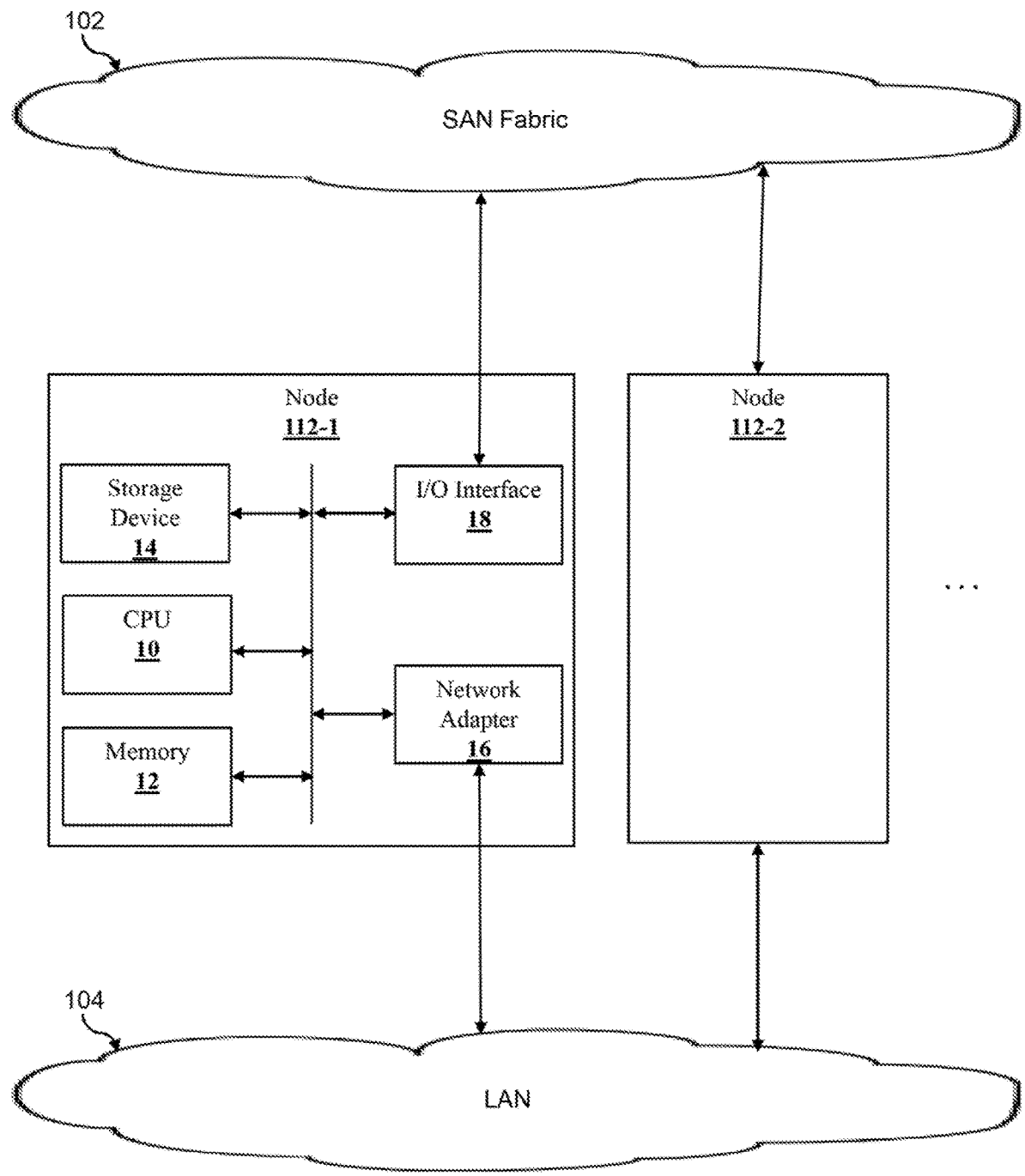
FIG. 2 is a block diagram which illustrates a node constituting a cluster of the hierarchical storage system, in accordance with an embodiment of the invention.
Figure 3:
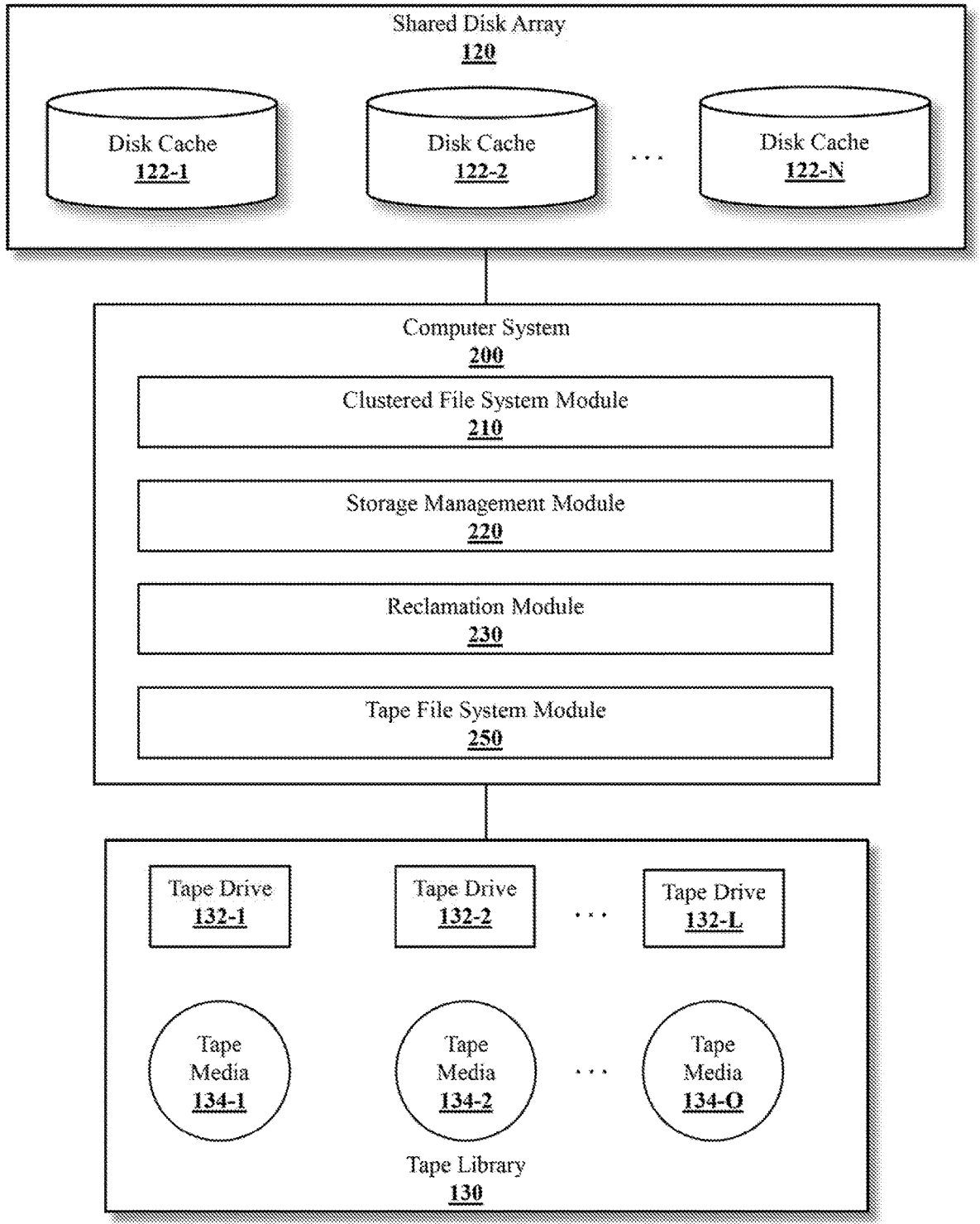
FIG. 3 is a block diagram which illustrates the hierarchical storage system, in accordance with an embodiment of the invention.

Referring to series of FIGS. 1-3, a hierarchical storage system with disk and tape tiers according to an exemplary embodiment of the present invention is described.

FIG. 1 illustrates an overview of the hierarchical storage system 100, in accordance with an embodiment of the invention. The hierarchical storage system 100 includes a cluster 110 with one or more nodes 112-1~112-M. The cluster 110 provides a file system that allows for performing file operations to the hierarchical storage system 100.

As shown in FIG. 1, the hierarchical storage system 100 may include a shared disk array 120 that includes one or more disk caches 122-1~122-N, which are storage devices storing files. Each node 112-1~112-M in the cluster 110 may be connected to the disk cache 122-1~122-N in the shared disk array 120 via a SAN (Storage Area Network) fabric 102. The SAN fabric 102 may include, but not limited to, FC (Fibre Channel)–SAN based on a fiber channel network and/or IP (Internet Protocol)–SAN based on TCP (Transmission Control Protocol)/IP network with LAN (Local Area Network) switches, etc.

The nodes 112-1~112-M may share the disk caches 122-1~122-N. The nodes 112-1~112-M can access to the disk cache 122-1~122-N via the SAN fabric 102 and provide indirect file access for other nodes that do not connect to the SAN fabric 102. A file system distributed to the one or more nodes 112-1~112-M in the cluster 110, to which a plurality of nodes (may include client nodes) can access, is so called a clustered file system or a distributed parallel file system. The clustered file system can provide a global namespace, a striping functionality to stripe input and output over the nodes and an information lifecycle management (ILM) functionality.

The hierarchical storage system 100 may include a tape library 130. The tape library 130 includes one or more tape drives 132-1~132-L and one or more tape media 134-1~134-O. Any tape media 134-1~134-O can be a medium for either source or target of copy operations. Each node 112-1~112-M in the cluster 110 may be connected to the tape library 130 via the SAN fabric 102 via cables, such as, but not limited to, FC LVD (Low Voltage Differential) SCSI (Small Computer System Interface) or SAS (Serial Attached SCSI) cables. Equipping the plurality of the tape drives 132-1~132-L enables the node 112-1~112-M to access a set of the tape media 134-1~134-O simultaneously. The tape drives 132-1~132-L may be occupied by the nodes 112-1~112-M at a point in time and may be used alternately. The tape drives 132-1~132-L may accept LTO (Linear Tape-Open) Ultrium 5 or later tape cartridges, which support LTFS (Linear Tape File System™), or other proprietary formats.

The tape library 130 is managed by the computer system 200, which may be a tape file system such as, but not limited to, LTFS (Linear Tape File System™) and integrated to the clustered file system so that at least part of data in the shared disk array 120 is stored on tape media 134-1~134-O in the tape library 130. Files may migrate from the shared disk array 120 to the tape library 130 based on a predetermined migration policy.

The hierarchical storage system 100 may include further a control terminal 140. The control terminal 140 is a terminal device where an administrative user can operate to issue manual request and to specify settings of the hierarchical storage system. By using the control terminal 140, the administrative user can specify settings of a novel reclamation and/or inter-generation copy process according to the exemplary embodiment of the present invention, which will be described in more detail later. The administrative user can also issue manual request and specify schedules or policies for other functionalities of the hierarchical storage system 100 such as standard migration, recall, reconciliation, file placement, file management, etc.

As shown in FIG. 1, in the describing embodiment, the nodes 112-1~112-M are described to be connected to the disk caches 122-1~122-N in the shared disk array 120 and the nodes 112-1~112-L are described to be connected to the tape drives 132-1~132-L in the tape library 130. However, the configuration of the hierarchical storage system 100 shown in FIG. 1 is only an example for typical storage system and is not intended to suggest any limitation.

For instance, in a particular embodiment, the shared disk array may be divided to one or more online storages and one or more nearline storages to construct a three or more tiered architecture. In another particular embodiment, the hierarchical storage system may include further a flash storage tier on top of the hierarchical storage system. In a further embodiment, the storage system may have merely one node 112, one disk 122 cache and one tape drive 132 to construct a hierarchical storage system. In yet another embodiment, another type of a sequential access medium may be used as a storage medium for both source and target in place of or in addition to the tape media.

FIG. 2 illustrates a schematic diagram of an example node 112-1 in accordance with an example embodiment of the invention. The node 112-1 is only one example of a suitable node and is not intended to suggest any limitation as to the scope of use or functionality of embodiments of the invention described herein. Regardless, the node 112-1 is capable of being implemented and/or performing any of the functionality set forth herein.

The node 112-1 is operational with numerous other general purpose or special purpose computing system environments or configurations. Examples of well-known computing systems, environments, and/or configurations that may be suitable for use with the node 112-1 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The node 112-1 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 2, the node 112-1 is shown in the form of a general-purpose computing device. The components of the node 112-1 may include, but are not limited to, one or more processors (or processing units) 10 and a memory 12 operatively coupled to the processors 10 by a bus including a memory bus or memory controller, and a processor or local bus using any of a variety of bus architectures.

The node 112-1 typically includes a variety of computer system readable media. Such media may be any available media that is accessible by the node 112-1, and it includes both volatile and non-volatile media, removable and non-removable media.

The memory 12 can include computer system readable media in the form of volatile memory, such as random access memory (RAM). The node 112-1 may further include other removable/non-removable, volatile/non-volatile computer system storage media. By way of example only, the storage device 14 can be provided for reading from and writing to a non-removable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, the storage device 14 may include at least one program product having a set (e.g., at least one) of program modules that are configured to carry out the functions of embodiments of the invention.

Program/utility, having a set (at least one) of program modules, may be stored in the storage device 14 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The node 112-1 may also communicate with one or more peripherals such as a keyboard, a pointing device, etc.; a display; one or more devices that enable a user to interact with the node 112-1; and/or any devices (e.g., network card, modem, etc.) that enable the node 112-1 to communicate with one or more other computing devices via SAN fabric 102. Such communication can occur via Input/Output (I/O) interfaces 18. Still yet, the node 112-1 can communicate with one or more networks such as a local area network (LAN) 104, a general wide area network (WAN), and/or a public network (e.g., the Internet) via the network adapter 16. As depicted, the network adapter 16 communicates with the other components of the node 112-1 via bus. It should be understood that, although not shown, other hardware and/or software components could be used in conjunction with the node 112-1. Examples, include, but are not limited to: microcode, device drivers, redundant processing units, external disk drive arrays, RAID systems, tape drives, and data archival storage systems, etc. The node 112-1 may be interconnected with another node 112 via a host channel adapter (HCA) such as InfiniBand (TM).

Hardware and/or software components of the tape library 130, the tape drives 132-1~132L, the control terminal 140 may include, similar to the node 112-1 shown in FIG. 2, a processer, a memory, a read only memory, a network adapter, an I/O interface, and robotic mechanism, although not shown in the drawings. Node 112-1 may be further understood with reference to FIG. 6.

FIG. 3 illustrates a block diagram of the hierarchical storage system 100 is. As shown in FIG. 3, the hierarchical storage system 100 includes a computer system 200 connected to the shared disk array 120 and the tape library 130. The computer system 200 may be composed of the nodes 112-1~112N in the cluster 110 shown in FIG. 1 and FIG. 2. The computer system 200 may be, for example, a Linear Tape Transfer System such as IBM Spectrum Archive Enterprise Edition, (LTFS_EE).

As shown in FIG. 3, the computer system 200 includes a clustered file system module 210; a storage management module 220; a reclamation module 230; and a tape file system module 250.

The clustered file system module 210 may be a software component that manages the clustered file system on the shared disk array 120 in the hierarchical storage system 100. The tape file system module 250 may be a software component that allows for performing file operations to the tape media 134-1~134-O and providing interface to manipulate files on the tape media 134-1~134-O in the tape library 130. The tape media 134-1~134-O in the tape library 130 may be accessed as subdirectories under a mount point of the tape library 130.

The storage management module 220 may be a software component that provides integration of the clustered file system managed by the clustered file system module 210 with the tape file system managed by the tape file system module 250. The storage management module 220 manages standard migration and recall activities in the hierarchical storage system 100.

The reclamation module 230 may be a software component that provides the novel reclamation function according to one or more embodiments of the present invention.

Before describing the novel reclamation function in detail, normal functionalities including standard migration and recall in the hierarchical storage system 100 will be described.

Migration is a process in which files are moved from the shared disk array 120 to the tape media 134-1~134-O on the tape library 130. The migration process may have plurality of modes. In a first mode, the migration process leaves behind a small stub file on the shared disk array 120, which points the file body migrated to the tape media. The migration process in a second mode is so-called as a pre-migration, in which files are moved from the shared disk array 120 to the tape media 134-1~134-O on the tape library 130 without replacing the file body with a stub file on the shared disk array 120. According to the pre-migration mode, identical copies of the files are on both the disk and the tape tiers, i.e. the shared disk array 120 and the tape library 130. Recall is a process in which the migrated files are moved from the tape media 134-1~134-O back to the originating disk tier, i.e. shared disk array 120 if an accessed file does not exist on the shared disk array 120.

The files newly created or overwritten to the hierarchical storage system 100 may initially be merely on the shared disk array 120, thus the file state is initially "resident". The files may be migrated from the shared disk array 120 to the tape library 130 by running the migration process in first mode, after which the file is a stub on the disk and the identifiers of the tapes storing the copies are written to metadata. The file state of such file is referred to as "migrated". The file may be recalled from the tape library 130 by recall activities when an application attempts to read from the file. The file state of such file on both the disk and tape tiers, i.e. the shared disk array 120 and the tape library 130 is referred as "pre-migrated". Also the files may be pre-migrated to the tape library 130 by running the migration process in second mode.

A desired reclamation function, in which only a single tape drive is utilized will now be described.

Figure 4:
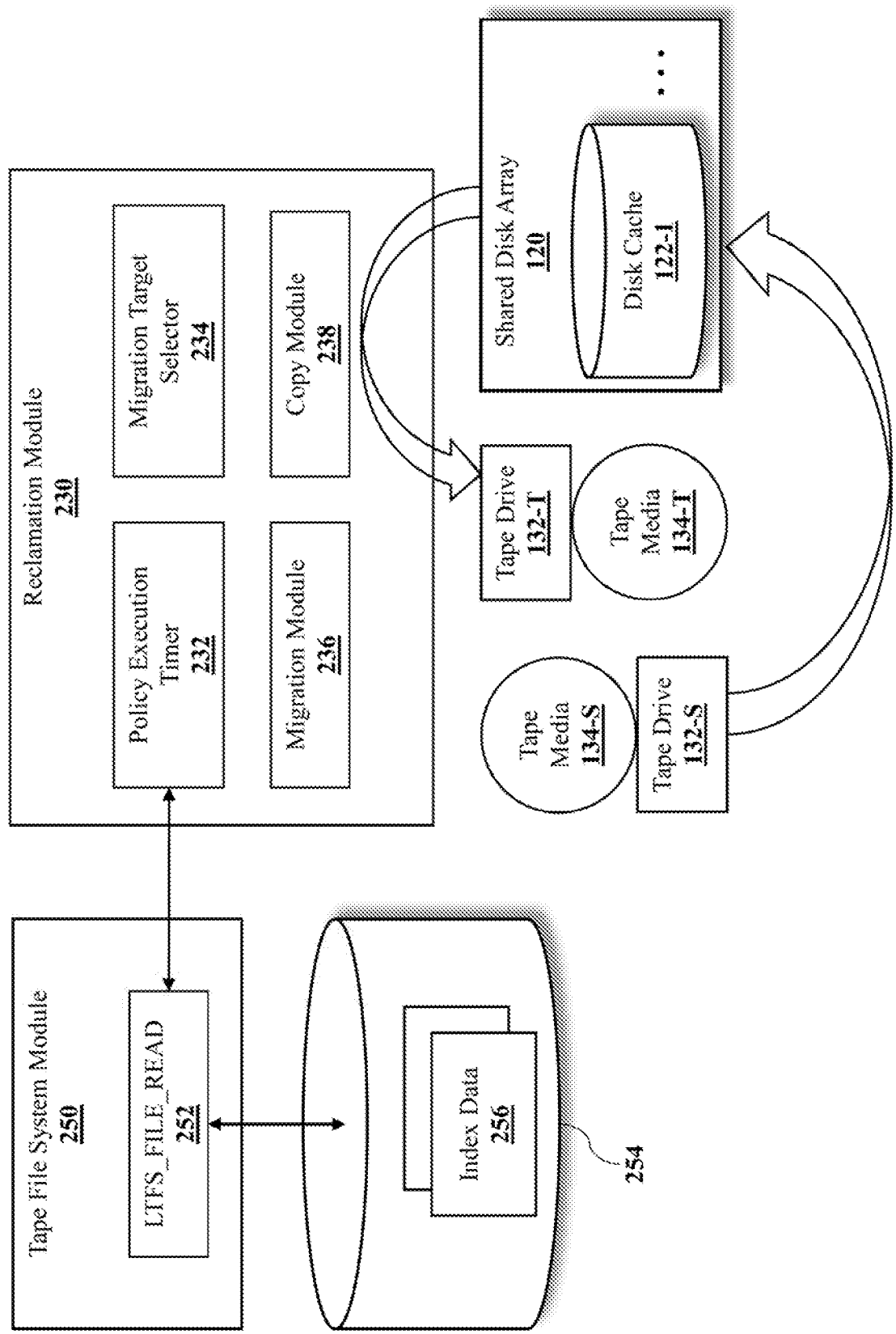
FIG. 4 is a block diagram which illustrates a reclamation module, in accordance with an embodiment of the invention.

FIG. 4 illustrates a block diagram of the reclamation module 230 and the tape file system module 250, in accordance with an embodiment of the invention. In FIG. 4, a detailed block diagram of the reclamation module 230 is depicted with other components related to the novel reclamation function, which include the tape file system module 250, the plurality of the tape drives 132-1~132-L, the plurality of the tape media 134-1~134-O, and the disk cache 122-1~122-N.

The tape media 134 that stores target files of reclamation is referred to as a source medium 134-S. The tape media 134 that is used as a target (or destination) of the reclamation is referred to as a target medium 134-T. For example, the tape drive 132 that holds the source media 134 is referred to as a source tape drive 132-S and the tape drive 132 that holds the target medium 134 is referred to as a target tape drive 132-T.

Data reclamation is a process in which active data on the source medium 134-S is copied to the target media 134-T to defragment. Some implementations may automatically trigger the reclamation process when the ratio of the active data on the tape medium falls below a predetermined level. Since files stored on the shared disk array 120 are often moved to the tape library 130 using the plurality of the tape drives 132-1~132-L at once, data is typically written to multiple tape media 134-1~134-O evenly. Therefore, the multiple tape media 134-1~134-O may have to be involved in the reclamation process simultaneously. Further, disk cache 122-1~122-N in shared disk array 120 may be a source storage device that stores a plurality of files as a target for migration which is performed during the reclamation process. For example, disk cache 122-1~122-N may store data which is in a pre-migrated state, meaning the data is located both on the disk cache 122-1~122-N and one or more of the source tape media 134-1~134-O.

In one or more embodiments described herein, a novel reclamation function for reclaiming data from the source media 134-S and disk cache 122-1~122-N to the target media 134-T, in which a single tape dive 132-T is used to write the data to the target media 134-T, may be described as being incorporated into the hierarchical storage system 100.

For this purpose, as shown in FIG. 4, the reclamation module 230 includes a policy execution timer 232, a migration target selector 234, a migration module 236 and a copy module 238. The disk cache 122-1~122-N may be a source storage device that stores a plurality of files as a target for migration which is performed during the reclamation process.

The policy execution timer 232 may be configured to time the execution period of data migration from a source media 134-S to the shared disk array 120. In an exemplary embodiment of the invention, the policy execution period is 5 minutes.

The migration target selector 234 may be configured to identify data stored on the source media 134-S and/or disk cache 122-1~122-N to be reclaimed, i.e. read from the source media 134-S and/or disk cache 122-1~122-N and then written to the target media 134-T. The policy execution timer 232 may also insert a flag on the data to be reclaimed. The data may be flagged in accordance with a pre-programmed migration and/or reclamation policy or the data may be flagged by a user. The policy execution timer 232 may further identify the state of the data to be read from the source media 134-S and/or disk cache 122-1~122-N. For example, the policy execution timer 232 may identify the data stored on the source media 134-S and/or disk cache 122-1~122-N as being in, for example, a pre-migrated state, a resident state, or a migrated state.

In the case where flagged data is in a pre-migrated state, the migration module 236 may be configured to read the data from the primary storage tier, i.e. the shared disk array 120, and write the flagged data to a tape, i.e. the target media 134-T, on the secondary storage tier, i.e. in tape library 130, which is the reclaim destination tape based on a migration policy. After the migration module 236 writes the flagged pre-migrated file to the tape library 130, the migration module 236 clears flag, deletes the file entity, and places the file in the migrated state.

In the case where a flagged data is in a migrated state, the copy module 238 may readout the data using low privilege recall from the source tape drive 132-S to the shared disk array 120, i.e. the primary storage tier. In other words, the flagged data is moved from the migrated state to a pre-migrate state. The recall of flagged migrated data from the source tape drive 132-S to the shared disk array 120 requires that a region corresponding to the size of the file be secured on the shared disk array 120. Thus, copy module 238 may determine the amount of data storage space needed on the shared disk array 120 for the data be migrated to the shared disk array 120 from the source media 134-S. For example, data which is to be reclaimed to a target media 134 from a source media 134-S needs to first be transferred to the shared disk array 120. However, if all the data to be reclaimed from source media 134-S were transferred to the shared disk array at the same time, then large amounts of storage space would need to be available on an expensive primary storage unit, i.e. the shared disk array 120. As an example, 10 TB of data can be written to a TS1150 tape; however, when data is written to a TS1150 tape it is usually compressed at a rate of approximately 1:2.5, depending on a type of the data. Thus, it is necessary to secure 25 TB of available storage capacity on the primary storage, i.e. the shared disk array 120, in advance of reclamation. The present invention decreases the amount of space need on the shared disk array 120 by limiting the time of the migration process as discussed above. In an example embodiment where the policy execution timer 232 limits migration of data, which has been compressed at a ratio of 1:2.5, from the source media 134-S to the shared disk array 120 at a speed of 360 MB/sec to 5 minute intervals, only 270 GB of data storage space is needed on the shared disk array 120 (36 MB/sec×5 Min×60 Sec×2.5=270 GB).

Further, for migrated files, the tape file system module 250 may include a function (LTFS FILE READ) 252 which records information about the data such as, but not limited to the name of the tape media 134-1~134-O in which the file is stored in the index data 256. The index data 256 may be a data structure in a Unix-style file system that describes a filesystem object such as a file or a directory. Each index data 256 may store the attributes and disk block location(s) of the file. File attributes may include metadata (times of last change, access, modification), as well as owner and permission data. Directories are lists of names assigned to the index data 256. A directory contains an entry for itself, its parent, and each of its children.

For example, a migrated file, file X, may be stored in tapes JD0100JD, JD0101JD and JD0102JD. Thus, the tape file system module 250 would record the name of the these tapes, which are examples of tape media 134-1~134-O, as an attribute designated, for example as, IBMTPS. Thus, index data 256 for file X may look like Table 1 below:

TABLE 1

| name: FileX |
| state: pre-migrated/migrated |
| IBMTPS: JD0100JD JD0101JD JD0102JD |

Further, if a migrated file is stored in multiple tape media 134-1~134-O, such as tapes JD0100JD, JD0101JD and JD0102JD, the tape file system module 250 may designate those tapes a source tape media and the name of the tape is moved to another attribute, such as IBMTPS_MV, in index data 256. Therefore, if reclaim processing is interrupted halfway due to the execution period terminating in accordance with policy execution timer 232, it is ensured that the data can be read out from the tape designated in IBMTPS_MV. For example, index data 256 for migrated data stored on multiple tape media 134 may look like Table 2 below:

TABLE 2

| Name: FileX |
| State: pre-migrated/migrated |
| IBMTPS null JD0101JD JD0102JD |
| IBMTPS_MV JD0100JD |

Figure 5:
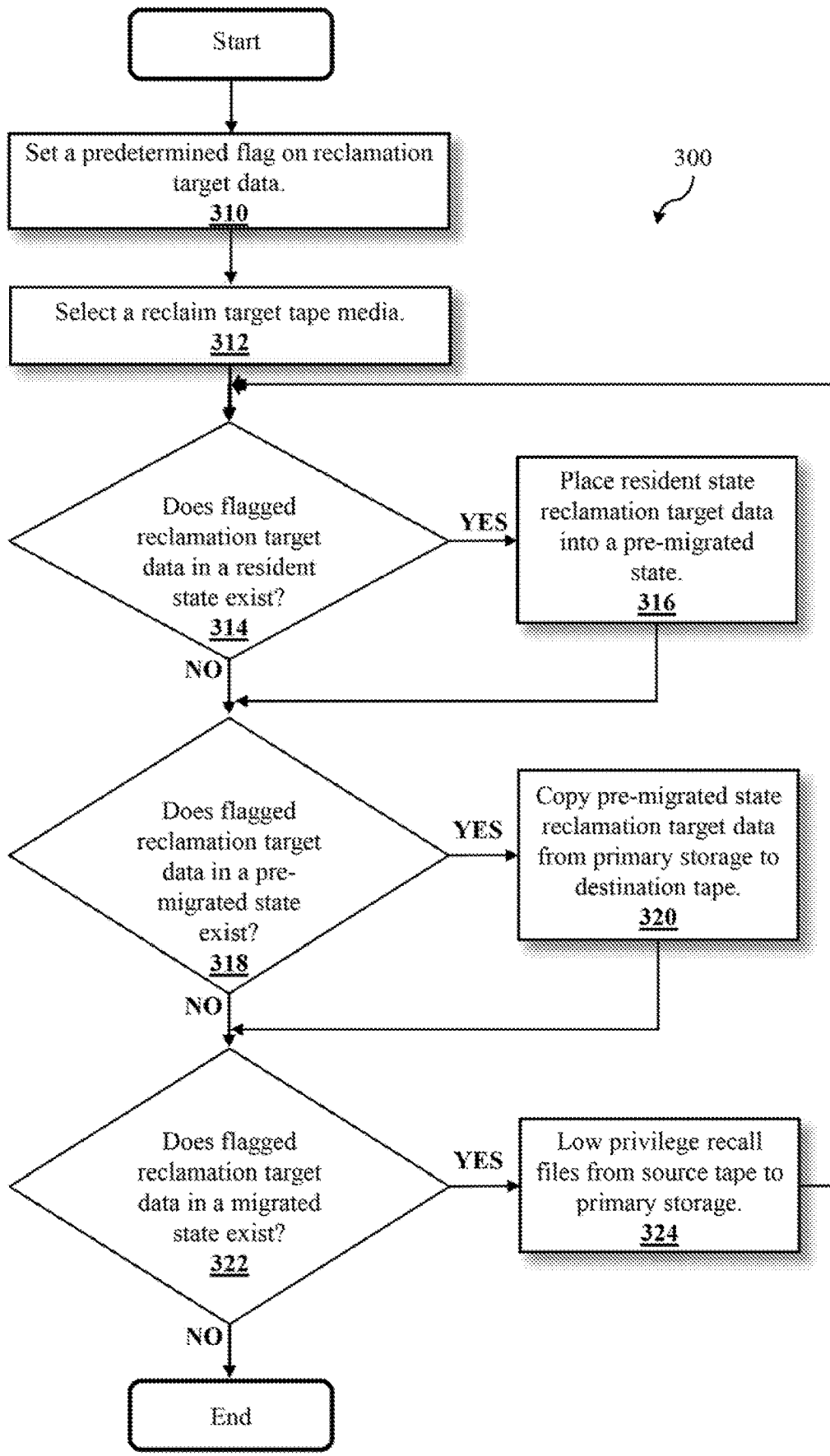
FIG. 5 is a flowchart illustrating a method for tape drive data reclamation.

Referring to FIG. 5, a method 300 for tape drive data reclamation using only a single tape drive in a storage system according to an embodiment of the present invention is described. It can be appreciated that Note that the process shown in FIG. 5 may be performed by the node 112-1 allocated to handle the novel reclamation process in response to receiving a request for the novel reclamation from users or determining that a condition that triggers the novel reclamation is met.

Referring to block 310, the node 112 sets a predetermined flag on data stored in the shared disk array 120 and the tape library 130. The predetermined flag indicates data that is to be reclaimed from disk cache 122-1~122-N and tape media 134-1~134-O to a target tape media 134-T. The data to be reclaimed from tape media 134-1~134-O may hereinafter be referred to as reclamation target data. The reclamation target data may be flagged in response to receiving a request for reclamation from one or more users. In another embodiment of the invention, the reclamation target data may be flagged by determining that a condition that triggers reclamation is met. For example, when the proportion of valid data on tape media 134-1~134-O to all data on tape media 134-1~134-O is lower than 35 percent, i.e. 35 percent or less of the data on tape media 134-1~134-O is valid, the reclamation process may be automatically triggered by the node 112.

Referring to block 312, a target tape media 134-T to which the reclamation target data is to be written is selected by node 112.

Referring to block 314, node 112 determines if flagged reclamation target data in a resident state exists. If the node 112 determines that flagged reclamation target data in a resident state does exist, the node 112 will place the resident flagged reclamation target data into a pre-migrated state by copying the flagged reclamation target data from the shared disk array 120 to the tape library 130 at block 316 and the process will then proceed to block 318. If node 112 determines that no flagged reclamation target data in a resident state exists, the process proceeds to block 318.

Referring to block 318, the node 112 determines if flagged target reclamation data in a pre-migrated state exists. If the node 112 determines that flagged reclamation target data in a pre-migrated state does exist, the node 112 will copy the pre-migrated flagged reclamation target data from the shared disk array 120 to the target tape media 134-T in tape library 130, using the migration module 236 at block 320. The process will then proceed to block 322. If node 112 determines that no flagged reclamation target data in a pre-migrated state exists, the process proceeds to block 322.

Referring to block 322, the node 112 determines if flagged target reclamation data in a migrated state exists. If the node 112 determines that flagged reclamation target data in a migrated state does exist, the node 112 will execute a low privilege recall of the migrated flagged reclamation target data from the tape library 130 to the shared disk array 120 using copy module 238 at block 324. In a preferred embodiment of the invention, the process of low privilege recall will last for a pre-determined period of time, such as, 5 minutes. Once the predetermined period of time has lapsed, the low privilege recall will end and the process will then proceed back to block 314 and repeat the process of blocks 314-322 until all migrated data has been recalled. If, after block 322, no more target reclamation data is left to be reclaimed, the process will end. It can be appreciated that while normal recall processing is executed at the highest privilege, low privilege recall as executed here is performed at a lower privilege than those of recall and migration/pre-migration. By this means, this keeps execution of other processing from being held until the recall processing is finished. If processing with high privilege such as migration/pre-migration occurs during execution of the low privilege recall, processing of the low privilege recall is interrupted. Because the interrupted file is in a migrated state, and there is a record in IBMTPS_MV, low privilege recall is executed again at block 324 in the next round of processing which is performed five minutes later, in an exemplary embodiment of the invention.

Figure 6:
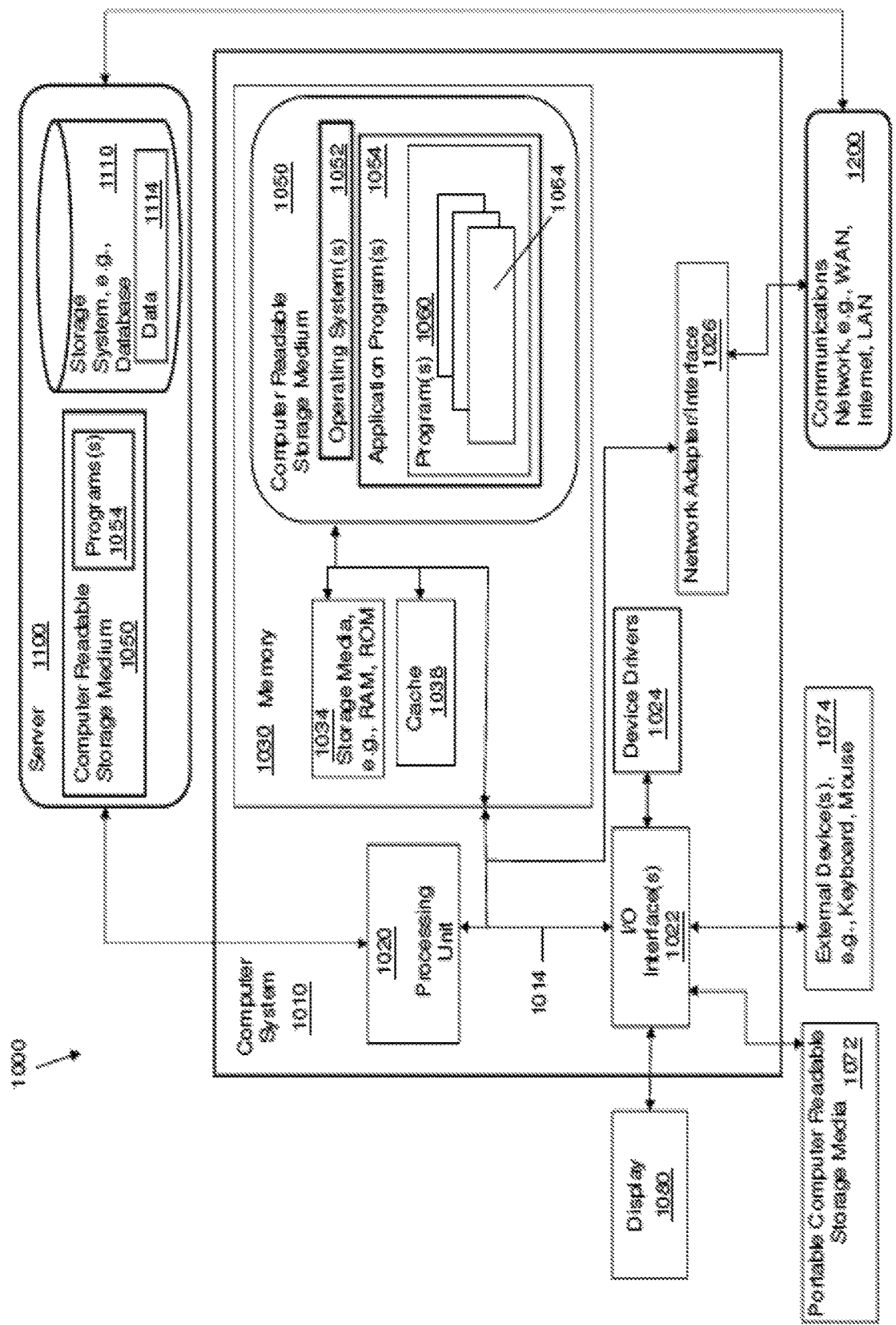
FIG. 6 is a block diagram depicting the hardware components of the data reclamation system of FIG. 1, in accordance with an embodiment of the invention.

Referring to FIG. 6, a system 1000 includes a computer system or computer 1010 shown in the form of a generic computing device. The method 300, for example, may be embodied in a program(s) 1060 (FIG. 6) embodied on a computer readable storage device, for example, generally referred to as memory 1030 and more specifically, computer readable storage medium 1050 as shown in FIG. 6. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 6 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 6 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 6, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media.

Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 300 (FIG. 5), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
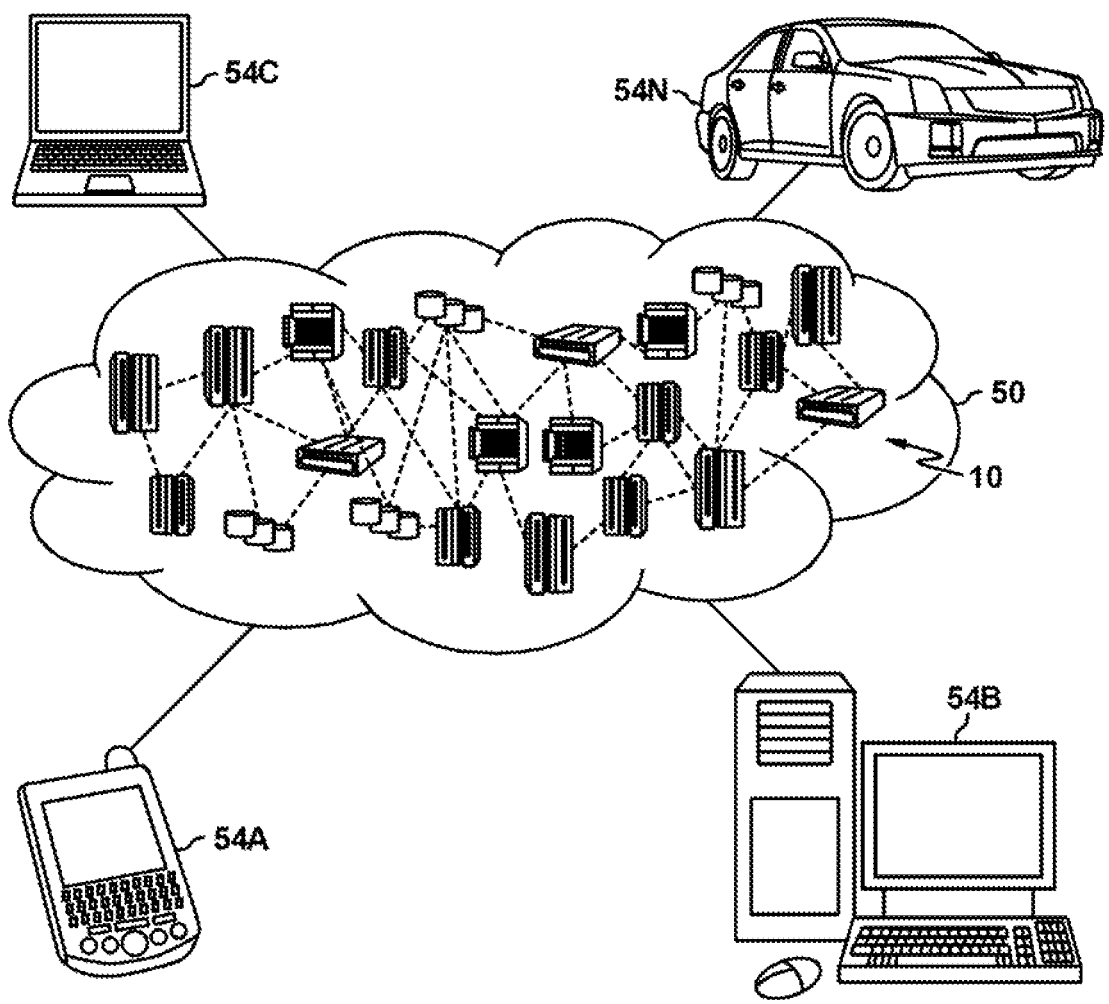
FIG. 7 illustrates a cloud computing environment, in accordance with an embodiment of the invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
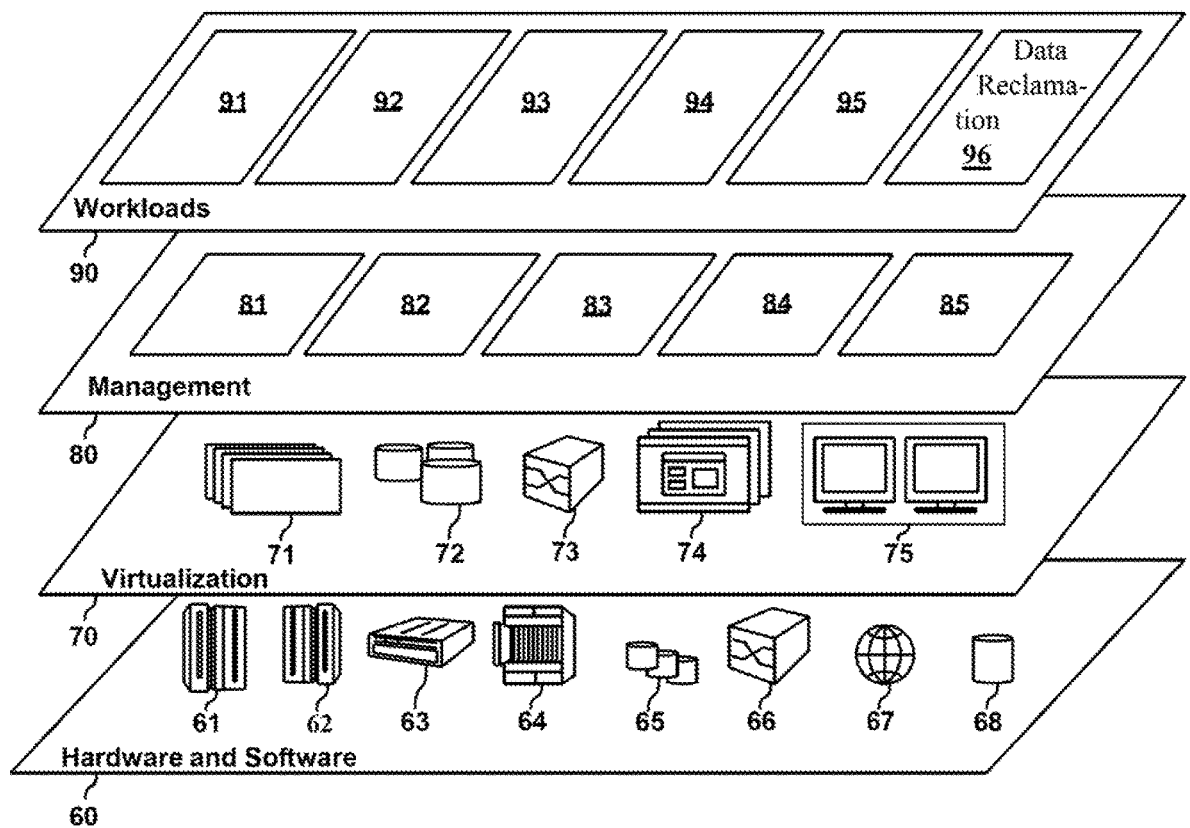
FIG. 8 illustrates a set of functional abstraction layers provided by the cloud computing environment of FIG. 7, in accordance with an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data reclamation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for copying data from source media to target media in a storage system, the method comprising:
   setting a predetermined flag on data to be copied from a primary storage tier and a secondary storage tier, by a node in a computer system;
   identifying, by the node, migrated data being a first portion of the flagged data in a migrated state stored on the secondary storage tier;
   recalling, by the node, the flagged migrated data from the secondary storage tier to the primary storage tier; and
   migrating, by node, of recalled migrated data from the primary storage tier to the target medium.

2. A method as in claim 1, further comprising: identifying, by the node, pre-migrated data being a second portion of the flagged data in a pre-migrated state stored on the primary storage tier; migrating, by the node, the flagged pre-migrated data from the primary storage tier to a target medium.

3. A method as in claim 1, further comprising:
   identifying, by the node, a third portion of the flagged data in a resident state stored on the primary storage tier;
   transforming, by the node, the flagged resident data into pre-migrated data by placing a copy of the flagged resident data from the primary storage tier to the secondary storage tier to a target medium.

4. A method as in claim 2, wherein migrating, by the node, the flagged pre-migrated data from the primary storage tier to a target medium and migrating, by node, the recalled migrated data from the primary storage tier to the target medium is performed by a single tape drive associated with the target medium.

5. A method as in claim 1, wherein the migrated data is recalled from the secondary storage tier to the primary storage tier in pre-defined intervals at a low privilege.

6. A method as in claim 1, wherein the primary storage tier is a disk tier in a hierarchical storage system, and wherein the secondary storage tier is a tape library in the hierarchical storage system.

7. A method as in claim 1, wherein setting a predetermined flag on a data to be copied from a primary storage tier and a secondary storage tier, by a node in a computer system, is determined by a data migration policy, wherein the data migration policy initiates data reclamation when the proportion of valid data on a tape media is equal to or lower than 35 percent.

8. A computer program product for copying data from source media to target media in a storage system, the computer program product comprising:
   a computer-readable storage medium having program instructions embodied therewith, wherein the computer readable storage medium is not a transitory signal per se, the program instructions executable by a computer to cause the computer to perform a method, comprising:
   setting a predetermined flag on data to be copied from a primary storage tier and a secondary storage tier, by a node in a computer system;
   identifying, by the node, migrated data being a first portion of the flagged data in a migrated state stored on the secondary storage tier;
   recalling, by the node, the flagged migrated data from the secondary storage tier to the primary storage tier in one or more segments; and
   migrating, by node, the one or more segments of recalled migrated data from the primary storage tier to the target medium.

9. The computer program product as in claim 8, further comprising: identifying, by the node, pre-migrated data being a second portion of the flagged data in a pre-migrated state stored on the primary storage tier; and migrating, by the node, the flagged pre-migrated data from the primary storage tier to a target medium.

10. The computer program product as in claim 8, further comprising:
    identifying, by the node, a third portion of the flagged data in a resident state stored on the primary storage tier;
    transforming, by the node, the flagged resident data into pre-migrated data by placing a copy of the flagged resident data from the primary storage tier to the secondary storage tier to a target medium.

11. The computer program product as in claim 8, wherein migrating, by the node, the flagged pre-migrated data from the primary storage tier to a target medium and migrating, by node, the recalled migrated data from the primary storage tier to the target medium is performed by a single tape drive associated with the target medium.

12. The computer program product as in claim 8, wherein the migrated data is recalled from the secondary storage tier to the primary storage tier in pre-defined intervals at a low privilege.

13. The computer program product as in claim 8, wherein the primary storage tier is a disk tier in a hierarchical storage system, and wherein the secondary storage tier is a tape library in the hierarchical storage system.

14. The computer program product as in claim 8, wherein setting a predetermined flag on a data to be copied from a primary storage tier and a secondary storage tier, by a node in a computer system, is determined by a data migration policy, wherein the data migration policy initiates data reclamation when the proportion of valid data on a tape media is equal to or lower than 35 percent.

15. A system for copying data from source media to target media in a storage system, the system comprising:
- a computer system comprising, a processor, a computer readable storage medium, and program instructions stored on the computer readable storage medium being executable by the processor to cause the computer system to:
- set a predetermined flag on data to be copied from a primary storage tier and a secondary storage tier, by a node in a computer system;
- identify, by the node, migrated data being a first portion of the flagged data in a migrated state stored on the secondary storage tier;
- recall, by the node, the flagged migrated data from the secondary storage tier to the primary storage tier in one or more segments; and
- migrate, by node, the one or more segments of recalled migrated data from the primary storage tier to the target medium.

16. A computer system as in claim 15, further comprising program instruction to:
- identify, by the node, pre-migrated data being a second portion of the flagged data in a pre-migrated state stored on the primary storage tier; migrate, by the node, the flagged pre-migrated data from the primary storage tier to a target medium.

17. A computer system as in claim 15, further comprising program instruction to:
- identify, by the node, a third portion of the flagged data in a resident state stored on the primary storage tier;
- transform, by the node, the flagged resident data into pre-migrated data by placing a copy of the flagged resident data from the primary storage tier to the secondary storage tier to a target medium.

18. A computer system as in claim 15, wherein migrating, by the node, the flagged pre-migrated data from the primary storage tier to a target medium and migrating, by node, the recalled migrated data from the primary storage tier to the target medium is performed by a single tape drive associated with the target medium.

19. A computer system as in claim 15, wherein the migrated data is recalled from the secondary storage tier to the primary storage tier in pre-defined intervals at a low privilege.

20. A computer system as in claim 15, wherein setting a predetermined flag on a data to be copied from a primary storage tier and a secondary storage tier, by a node in a computer system, is determined by a data migration policy, the data migration policy initiates data reclamation when the proportion of valid data on a tape media is equal to or lower than 35 percent.

* * * * *